United States Patent [19]
Graham et al.

[11] 3,808,884
[45] May 7, 1974

[54] MECHANICAL TRANSDUCER
[76] Inventors: Erwin W. Graham; Wayne B. Graham, both of 1210 Camden Ave., both of Campbell, Calif. 95008
[22] Filed: Mar. 22, 1973
[21] Appl. No.: 343,828

[52] U.S. Cl. ................................................. 73/144
[51] Int. Cl. ............................................. G01l 5/06
[58] Field of Search ................. 74/25, 99 R; 73/144

[56] References Cited
UNITED STATES PATENTS
2,564,669   8/1951   Brady ............................ 73/407 R FOREIGN PATENTS OR APPLICATIONS
107,622   7/1917   Great Britain ...................... 74/99 R Primary Examiner—Jerry W. Myracle
Attorney, Agent, or Firm—Moore, Zimmermann & Dubb

[57] ABSTRACT
This invention relates to a device for translating small scale linear motion into discernible rotary motion by untwisting a pair of relatively inelastic twisted bands and, more particularly, relates to a mechanical transducer useful, for example, in a device for measuring the tension in a thin strip of material such as a continuous moving strip of magnetic tape.

16 Claims, 13 Drawing Figures

PATENTED MAY 7 1974　　　　　　　　　　　3,808,884
SHEET 1 OF 3
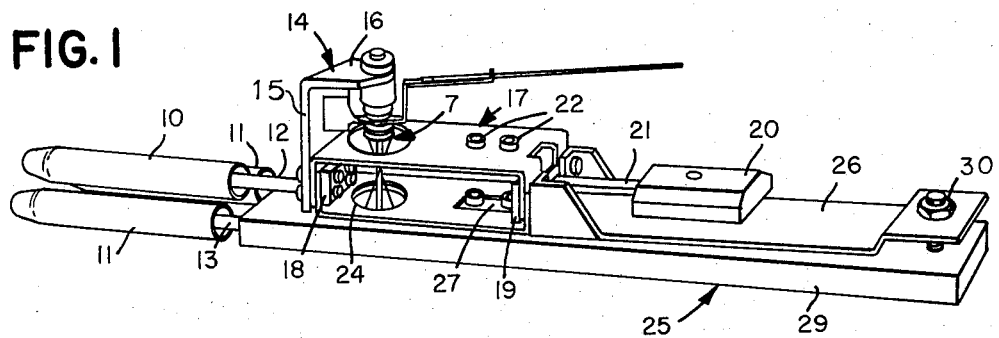
FIG. 1
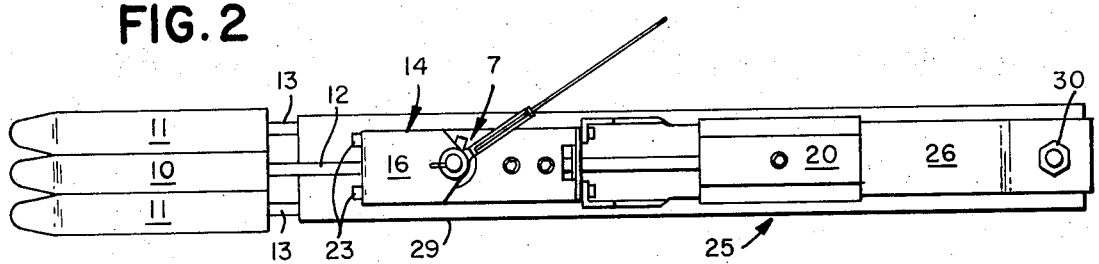
FIG. 2
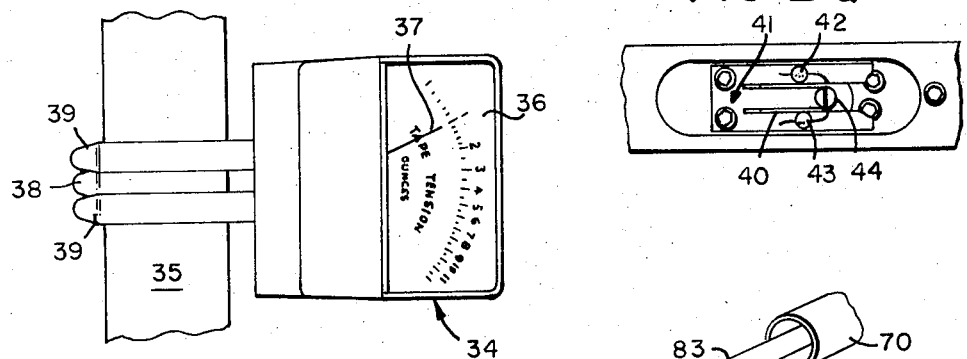
FIG. 2a
FIG. 3
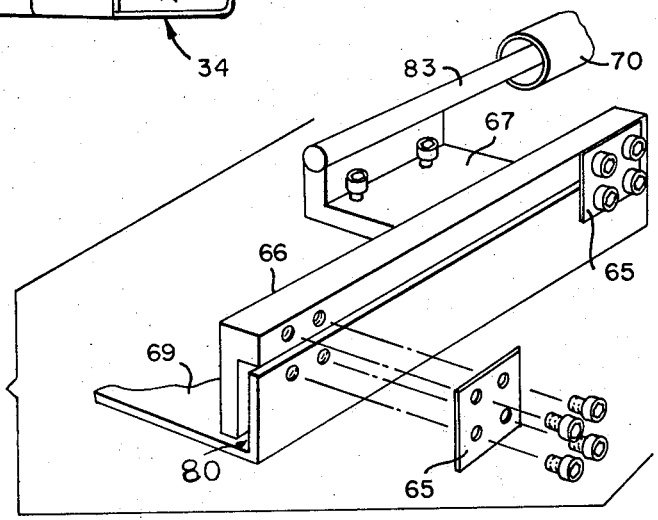
FIG. 4

MECHANICAL TRANSDUCER

BACKGROUND OF THE INVENTION

Mechanical transducers have largely employed conventional mechanical linkages, e.g. levers, pulleys, gears or springs, to translate linear motion into movement which can be indicated or read out on a meter face. These linkages have been inherently inefficient due to frictional forces so that it has been impracticable to obtain high sensitivity measurements of tension in continuous strips. In order to achieve any capability of measuring low tension in continuous strips, it has been necessary to have the strip counteract large forces in the transducer thereby causing the strip to be deformed and potentially damaged. Electronic meter movements have also been used in conjunction with electromechanical transducers in order to increase sensitivity but they have been bulky and costly to fabricate. Against this background, the desirability of an inexpensive simple, rugged and sensitive mechanical transducer is apparent.

Various prior art devices have disclosed the use of twisted bands to translate linear motion responsive to a linear force into rotary motion. In U.S. Pat. No. 2,564,669, a pressure measuring device is disclosed in which a circular rung is given a bias by the torsion wire from which the rung depends. A pair of bands is held in longitudinal bias with respect to the rung by a bellows. The expansion of the bellows stretches and untwists the pair of bands so that a tangential force is imparted to the rung and the torque bias is counteracted and the rung rotates. The use of the suspension means to impart torque renders it difficult to impart a precise torque to the rung. In U.S. Pat. No. 2,295,026, a support member has three torsion bands depending therefrom with a gravity responsive member attached to the bottom of the bands. A torque bias is applied to the gravity responsive member by twisting the torsion bands. As different gravity conditions are encountered, different forces will act on the gravity responsive member thereby causing the torque bias to be counteracted to a different degree.

SUMMARY OF THE INVENTION

A mechanical transducer translates linear motion into rotary motion by the action of untwisting twisted relatively inelastic bands. A first reference frame has a center support rotatably connected thereto and positioned at a fixed distance therefrom. The connection means, e.g. a suspension filament which cannot be stretched but can readily be rotated, connects the center support with the first reference frame. A torque biasing spring means which is seated in a second reference frame is attached to the center support to impart a rotary torque. At least one relatively inelastic band is connected between the second reference frame and a point on said center support not coincident with its center; normally this band is not in parallel alignment with the axis of the suspension filament or the torque biasing spring. Linkage means is provided for moving one of the reference frames with respect to the other in response to a linear motion so that the band is pulled along the direction of the axis of the suspension filament or the torque biasing means and is thereby untwisted so that a torque is imparted to said center support to cause it to rotate.

BRIEF DESCRIPTION OF THE DRAWINGS

For a more complete understanding of the mechanical transducer of the present invention reference may be had to the accompanying drawings which are incorporated herein and in which:

FIG. 1 is a perspective view of one embodiment of the mechanical transducer of the present invention as employed in a device for measuring tension in a thin strip;

FIG. 2 is a plan view of the device of FIG. 1;

FIG. 2a is a partial bottom view of the device of FIG. 1.

FIG. 3 is a front view of a thin strip tension measuring device incorporating the transducer of the present invention;

FIG. 4 is a perspective view of the spring hinge which hinges the two reference frames of the device of FIG. 10;

DESCRIPTION OF THE PREFERRED EMBODIMENTS

Figure 5:
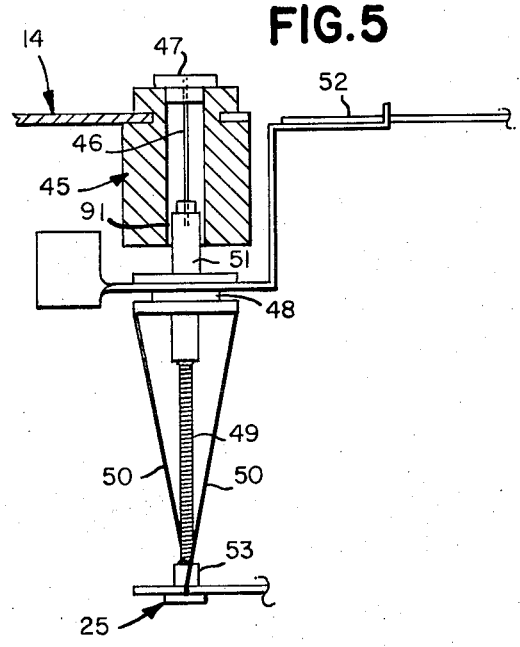
FIG. 5 is a pictorial representation of the untwisted mode, e.g. zero mode, of the mechanical transducer of FIGS. 1 and 2.
Figure 6:
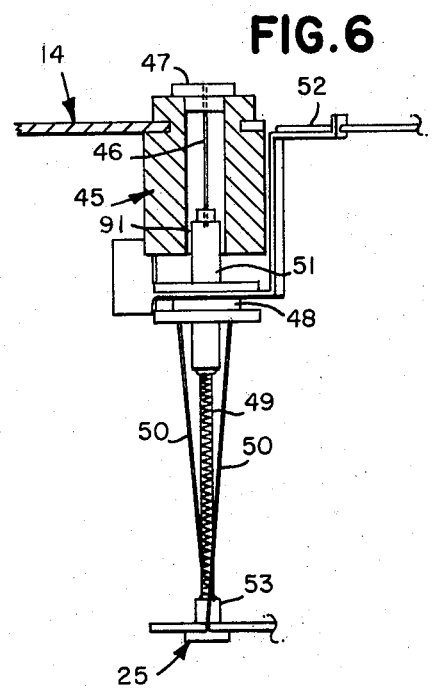
FIG. 6 is a pictorial representation of the partially untwisted mode, e.g. measuring mode, of the mechanical transducer of FIGS. 1 and 2.
Figure 7:
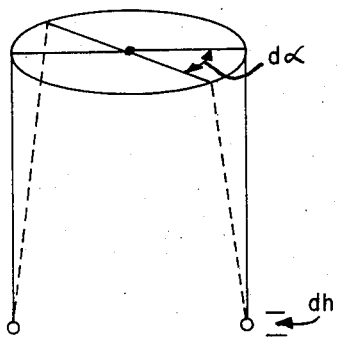
FIG. 7 is a schematic diagram of the trigonometric relationship between incremental variations in the distance between the center support and the second reference frame and the angle of rotation of the center support.

For a more detailed understanding of the mechanical transducer of the present invention, reference may now be had to FIGS. 5 and 6. FIG. 5 is a partial cross section view of the basic structure of the mechanical transducer. A cylindrical housing 45 is appended from the end of a first reference frame 14. Center support 48 is connected with the first reference frame 14 by suspension filament 46 which is attached to filament seat 47 at the top of cylindrical housing 45. Torque bias spring 49 is attached to the bottom side of center support 48 in axial alignment with suspension filament 46. Torque bias spring 49 is attached at its bottom to second reference frame 25. A pair of relatively inelastic bands 50 are also attached to second reference frame 25 and to the periphery of center support 48. A pointer 52 is attached as shown to center support 48.

It is evident that the relatively inelastic bands 50, as shown in FIG. 5, are twisted with respect to the axial alignment defined by torque bias spring 49 and suspension filament 46. If either first reference frame 14 is moved upwardly or second reference frame 25 is moved downwardly, the relatively inelastic bands 50 will experience a longitudinal force which will tend to align them with the axial alignment of torque bias spring 49 and suspension filament 46. Since the bands 50 are relatively inelastic, i.e., they can be stretched only a negligible amount, a torque is imparted to center support 48 in opposition to the torque bias introduced by torque bias spring 49. As a result, center support 48 rotates with the resultant movement of pointer 52.

It is evident that the opening 91 within cylindrical housing 45 is large enough to readily accommodate the upper portion 51 of center support 48 without the engagement thereof with the interior walls of cylindrical housing 45. However, the gap is small enough so that if center support 48 tends to oscillate out of axial alignment due to transient motions of various sorts, the upper portion 51 of center support 48 will engage the interior walls of cylindrical housing 45. This engagement damps the transient motion and provides a smoother movement for pointer 52.

An embodiment of the mechanical transducer of the present invention in which the first reference frame moves with respect to the second reference frame is shown in FIGS. 1 and 2. The first reference frame 14 consists of a stanchion 15 with a horizontal extension 16, a parallelogram spring assembly 17, mounting plates 18 and 19, counter weight 20, and dynamic roller 10. The second reference frame 25 consists of a rectangular base 29, parallelogram spring support 26, fixed position rollers 11 and support assembly 41. It is evident that upward movement of dynamic roller 10 is possible due to the movement of parallelogram spring 17 on parallelogram spring support 26. Such movement is initiated by passing a strip of thin material under tension between fixed position rollers 11 and dynamic roller 10. Fixed position rollers 11 may rotate upon their own axes, but in any event, do not move with respect to rectangular base 29 of second reference frame 25. The movement described by dynamic roller 10 will be generally along the bisector plane of fixed position rollers 11 as shown by trajectory b in FIG. 9.

A zero setting of first reference frame 14 with respect to second reference frame 25 may be obtained by adjusting nut 30 which determines the exact inclination of parallelogram spring support 26. A counterweight 20 is attached by means of screws 22 to the upper side of parallelogram spring 17 so that the transducer assembly 7 is not affected by the attitude at which the overall device is operated. The attachment of the bands of transducer assembly 7 to the seocnd reference frame is shown in FIG. 2a to be accomplished by connectors 42 and 43 of support assembly 41. Screw head 44 connects the bottom of the torque bias spring to finger 40 of support assembly 41 and allows a variable bias to be introduced to the torque bias spring. Additionally, support assembly 41 may be fabricated from thin spring metal so that the position of finger 40 can be adjusted at the factory or by a serviceman to establish the length of the torque bias spring.

Figure 10:
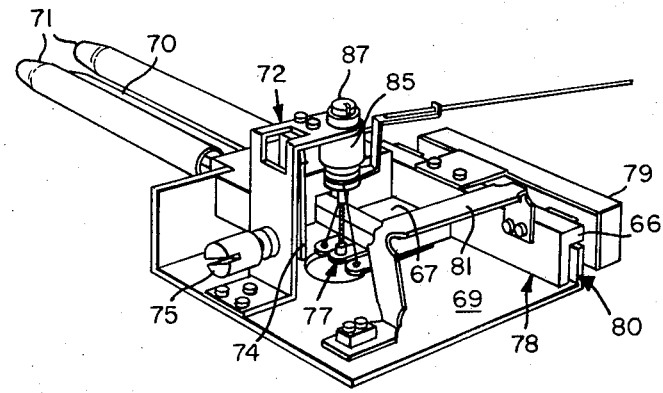
FIG. 10 is an upper perspective view of a second embodiment of the mechanical transducer of the present invention as employed in a device for measuring tension in a thin strip.
Figure 11:
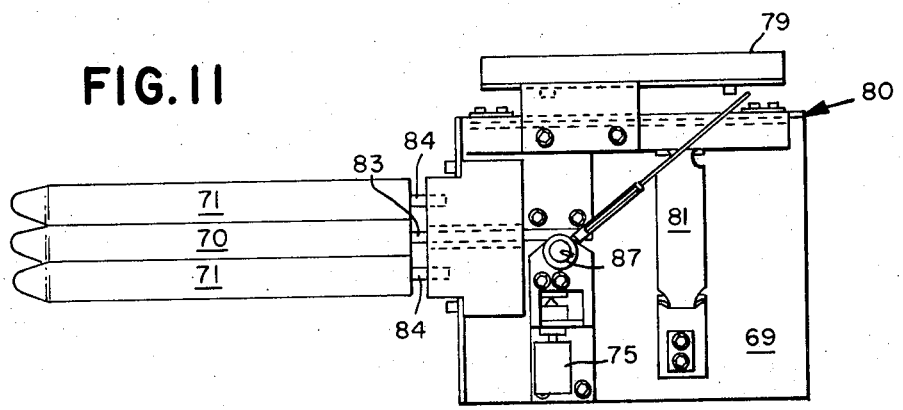
FIG. 11 is a plan view of the device of FIG. 10.
Figure 12:
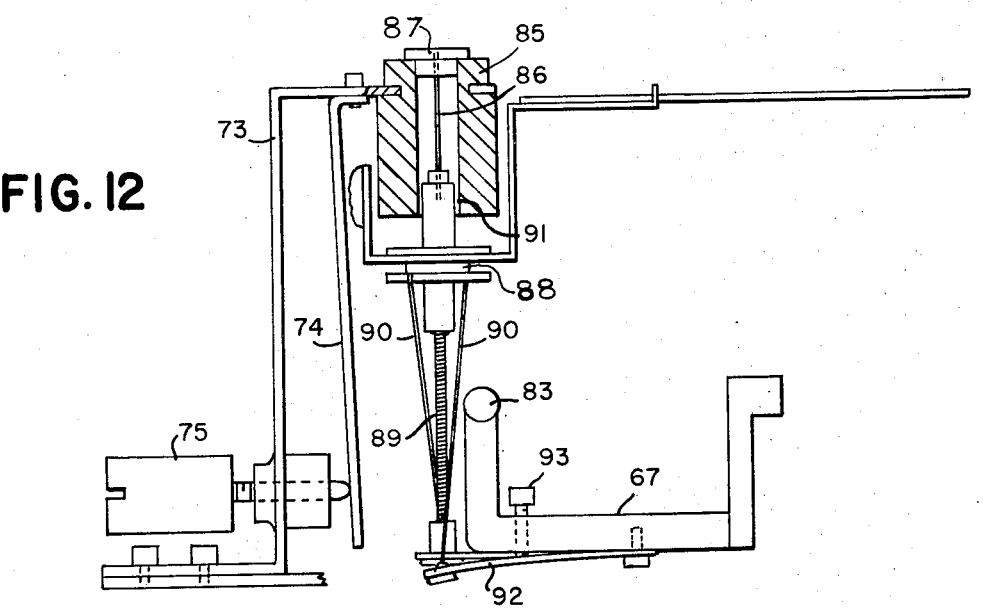
FIG. 12 is a partial cross-sectional view of the device of FIGS. 10 and 11.

A second embodiment of the mechanical transducer of the present invention is shown in FIGS. 10, 11 and 12 as incorporated in a device for measuring tension in thin strips of material. A first reference frame 72 consists of a S-shaped stanchion 73, housing 69, a zero adjust elbow 74 with adjust screw 75 and fixed position rollers 71. The second reference frame 78 consists of dynamic roller 70, tilt bar 67, spring hinge member 66, and counter weight 79. It is evident that the first reference frame 72 is attached to the second reference frame 78 by means of the spring hinge assembly 80 and bracket spring 81.

Figure 9:
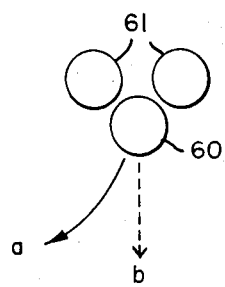
FIG. 9 is a schematic end view of the dynamic probe and the fixed position probes illustrating possible trajectories for the movement of the dynamic probe with respect to the fixed position probes.

As a strip of thin material under tension passes between fixed position roller 71 and dynamic roller 70, dynamic roller 70 will move downwardly and cause dynamic roller axle 83 to rotate tilt bar 67 against the resistance of spring hinge assembly 80 and bracket spring 81. The arc described by the movement of dynamic roller 70 will be that of trajectory a of roller 60 as shown in FIG. 9. The arc is such that the dynamic roller 70 moves in parallel alignment with the fixed position rollers 71 and so that the overlap allows a strip of thin material to readily slip between dynamic roller 70 and fixed position rollers 71. As shown in FIG. 12, the zero position of the first reference frame with respect to the second reference frame is obtained by forcing a zero adjust elbow 74 against the upper leg of S-shaped stanchion 73 by means of screw 75.

The structure of the mechanical transducer of FIG. 12 is functionally equivalent to that of FIGS. 5 and 6. Cylindrical housing 85 is attached to the upper leg of S-shaped stanchion 73. Center support 88 is suspended from suspension filament 86 which is attached to filament seat 87 at the top of cylindrical housing 85. Torque bias spring 89 is attached to the bottom of center support 88. Relatively inelastic bands 90 are attached to fingers 92 which extended from the forward portion of tilt bar 67. The position of the bottom of inelastic bands 90 is adjusted by means of adjustment screws 93.

Spring hinge assembly of the device of FIGS. 10 and 11 is shown in detail in FIG. 4. Axle 83 of dynamic roller 70 is rigidly attached to the end of tilt bar 67 which is integral with hinge member 66. Thin plates 65 are attached across hinge member 66 and the vertical side flange of first reference flange housing 69.

The range within which the mechanical transducer of the present invention will operate, of course, will depend upon the types of linear motion sensed and the mechanical advantage of the linkage employed. In the device of FIG. 10, adjustment of the stiffness of bracket spring 81 will vary the tension which is required to make the pointer of the transducer assembly 77 go full scale; the overlap of dynamic roller 70 with fixed position roller 71, in this case, would also determine the tension required to make the pointer move a specified distance on a calibrated meter face. If axially rotatable fixed position rollers are used, rather than probes which do not rotate, then less friction will have to be overcome by a moving continuous strip so that less tension is required to cause a given reading on the calibrated meter face.

Figure 8:
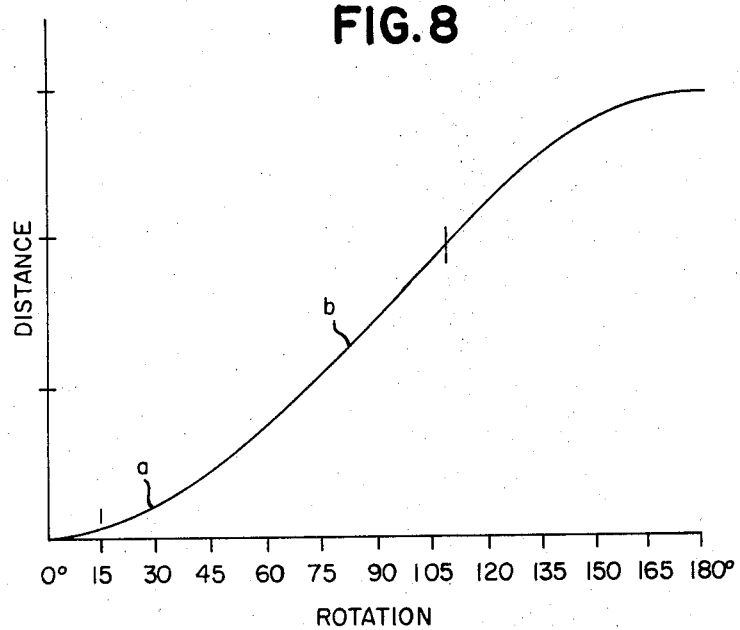
FIG. 8 is a graph showing the relationship between longitudinal distance and angular rotation for the mechanical transducer.

The mechanical transducer may be designed to incorporate a wide range of mechanical advantages, e.g. by varying the separation of bands, the length of the bands, and the torque bias introduced by the torque bias spring. The device itself is nonlinear due to the trigometric relationship between a longitudinal adjustment in distance between the center support and the second reference frame and the angular rotation of the center support. A graph of the relationship between changes in this longitudinal distance and the rotation of the center support is shown in FIG. 8. If a pair of bands is initially twisted to the point that they touch, and are gradually untwisted by movement of the second reference frame with respect to the center support, the resultant angular rotation is shown in FIG. 8. The relationship is nonlinear in region "$a$" but is relatively linear in region "$b$." Thus, if greater sensitivity is required in the measurement of small amounts of motion, an appropriate nonlinear transducer may be fabricated. The device is essentially instantaneously responsive so that it may be incorporated in test devices which require response read out.

The discussion heretofore has dealt with the use of the relatively inelastic bands to impart a torque to the center support as the bands are untwisted. The mechanical transducer of the present invention is operable in another mode, to wit, in a mode in which the inelastic bands are initially in parallel alignment with the suspension filament and in which the reference frames are brought closer together in response to a linear motion so that the bands collapse and the torque bias spring causes the center support to rotate. All of the embodiments described herein which pertain to the first mode are applicable as well to this mode. In this mode, a large force tending to push the transducer off scale will only collapse the bands; in the other mode, the bands will snap unless a safety stop is incorporated.

While the invention has been described in connection with specific embodiments thereof, it will be understood that it is capable of further modification, and this application is intended to cover any variations, uses or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

That which is claimed is:

1. A mechanical transducer for translating linear motion into rotary motion, comprising:
   a first reference frame;
   a center support rotatably connected to said first reference frame and positioned a fixed distance apart from said first reference frame;
   torque biasing spring means attached at one end to the center of said center support on the side opposite said connection to said first reference frame, said torque biasing spring means being attached at the other end to a second reference frame, said torque biasing spring means inducing a torque bias in said center support, said torque biasing spring means further inducing tension between said center support and said second reference frame;
   at least one relatively inelastic band connected between said second reference frame and a point on said center support not coincident with said center of said center support; and
   linkage means for moving one of said reference frames with respect to the other in response to a linear motion to cause said center support to rotate.

2. The mechanical transducer of claim 1 wherein said linkage means moves one of said reference frames closer to the other in response to said linear motion to collapse said spring means and thereby decrease the distance between said center support and said second reference frame so that said at least one band collapses and said spring imparts a torque to said center support to cause said center support to rotate.

3. A mechanical transducer as in claim 2 wherein said torque biasing spring means includes means for presetting the torque bias induced in said center support.

4. The mechanical transducer of claim 1 wherein said linkage means moves one of said reference frames apart from the other in response to said linear motion to stretch said spring means and thereby increase the distance between said center support and said second reference frame so that said at least one band imparts a torque contrary to said torque bias to cause said center support to rotate.

5. The mechanical transducer of claim 4 wherein said center support has a pointer attached thereto for indicating on a meter face the amount of rotary motion caused by said linear motion and wherein said torque biasing spring and said connection with said first reference frame are in substantial axial alignment and are centrally connected to said center support.

6. The mechanical transducer of claim 5 wherein said first reference frame includes a damping member having an aperture for receiving at least the upper portion of said center support, said aperture being large enough to receive said center support without engagement with the interior walls of said member but small enough so that said portion of said center support engages said walls if it rotates out of axial symmetry.

7. The mechanical transducer of claim 6 wherein said linkage means includes a dynamic probe attached to said second reference frame, said second reference frame being hinged with respect to said first reference frame so that movement of said dynamic probe causes said second reference frame to move with respect to said first reference frame so that said spring is stretched and said center support is rotated.

8. The mechanical transducer of claim 7 wherein at least two fixed position probes are attached to said first reference frame in parallel alignment with said dynamic probe, the overlap of said dynamic probe with said fixed position probes being selected so that a strip of a thin material under tension will readily slip between said dynamic probe and said fixed position probes.

9. The mechanical transducer of claim 8 wherein said hinge means further includes a counterweight to permit said transducer to be operable at any attitude.

10. The mechanical transducer of claim 9 wherein said first reference frame includes a zero adjustment means to allow adjustment of its initial position with respect to said second reference frame.

11. The mechanical transducer of claim 6 wherein said linkage means includes a dynamic probe attached to said first reference frame, said first reference frame being hinged to said second reference frame so that movement of said dynamic probe causes said first reference frame to move with respect to said second reference frame so that said spring is stretched and said center support is rotated.

12. The mechanical transducer of claim 11 wherein at least two fixed position probes are attached to said second reference frame in parallel alignment with said dynamic probe, the overlap of said dynamic probe with said fixed position probes being selected so that a strip of thin material under tension will readily pass between said dynamic probe and said static probes.

13. The mechanical transducer of claim 12 wherein said first reference frame includes a parallelogram spring which is attached at one end to said second reference frame, said parallelogram spring having a counterbalance weight attached thereto to permit said transducer to function at any attitude.

14. The mechanical transducer of claim 13 wherein said second reference frame includes a zero adjustment means to allow adjustment of its initial position with respect to said first reference frame.

15. A mechanical transducer for translating linear motion into rotary motion, comprising:
 a first reference frame;
 a center support rotatably connected to said first reference frame and positioned a fixed distance apart from said first reference frame;
 torque biasing spring means attached at one end to the center of said center support on the side opposite said connection to said first reference frame, said torque biasing spring being attached at the other end to a second reference frame, said torque biasing spring means inducing a torque bias in said center support, said torque biasing spring means including means for presetting the torque bias induced in said center support;
 at least one relatively inelastic band connected between said second reference frame and a point on said center support not coincident with said center of said center support; and
 linkage means for moving one of said reference frames with respect to the other in response to a linear motion to cause said center support to rotate, said linkage means moving one of said reference frames apart from the other in response to said linear motion to stretch said spring means and thereby increase the distance between said center support and said second reference frame so that said at least one band imparts a torque contrary to said torque bias to cause said center support to rotate.

16. The mechanical transducer of claim 15 wherein said presetting means is a screw head seated in said other end of said torque biasing spring means.

* * * * *